US012743439B2

(12) United States Patent
Shandyba et al.

(10) Patent No.: US 12,743,439 B2
(45) Date of Patent: Sep. 22, 2026

(54) SYSTEMS AND METHODS FOR MULTIDIMENSIONAL DATA STRUCTURING AND VISUALIZATION

(71) Applicants: Constructor Technology AG, Schaffhausen (CH); Constructor Education and Research Genossenschaft, Schaffhausen (CH)

(72) Inventors: Vasyl Shandyba, Dnipro (UA); Sergey Ulasen, Singapore (SG); Andrey Adashchik, Istanbul (AR); Serg Bell, Singapore (SG); Stanislav Protasov, Singapore (SG); Nikolay Dobrovolskiy, Alanya (AR); Laurent Dedenis, Geneva (CH)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 0 days.

(21) Appl. No.: 19/003,752

(22) Filed: Dec. 27, 2024

(65) Prior Publication Data

US 2026/0187087 A1 Jul. 2, 2026

(51) Int. Cl.
*G06F 16/248* (2019.01)
*G06F 16/22* (2019.01)
(Continued)

(52) U.S. Cl.
CPC ........ *G06F 16/248* (2019.01); *G06F 16/2264* (2019.01); *G06F 16/2468* (2019.01); *G06F 16/287* (2019.01); *G06F 16/9024* (2019.01)

(58) Field of Classification Search
CPC ............... G06F 16/248; G06F 16/2264; G06F 16/2468; G06F 16/287; G06F 16/9024;
(Continued)

(56) References Cited

U.S. PATENT DOCUMENTS 8,200,672 B2 6/2012 Adachi et al.
12,019,663 B1 * 6/2024 Zhang ................. G06F 16/3344
(Continued)

FOREIGN PATENT DOCUMENTS

CN 116127095 5/2023
CN 118152542 6/2024

OTHER PUBLICATIONS

Matsumoto, Nicholas, et al. "KRAGEN: a knowledge graph-enhanced RAG framework for biomedical problem solving using large language models." Bioinformatics 40.6 (2024) (Year: 2024).*

*Primary Examiner* — Dennis Truong
(74) *Attorney, Agent, or Firm* — ESPE Legal Consultancy FZ-LLC

(57) ABSTRACT

Systems and methods provide a multidimensional data structure to tailor data storage and corresponding user output. Tailored graph data structures reduce the level of hallucination in composing an answer to a user using a large language model. In response to a user query of documents, the user query is translated to a vector. From the vector, the most relevant pieces of documents that are as similar as possible in semantics to the question of a person can be determined and communicated to the user. In one aspect, using the vector base (vector query applied to the documents), a graph can be generated in the form of nodes and connections between data in the documents.

20 Claims, 17 Drawing Sheets

(51) Int. Cl.

| | |
|---|---|
| ***G06F 16/2458*** | (2019.01) |
| ***G06F 16/28*** | (2019.01) |
| ***G06F 16/901*** | (2019.01) |

(58) Field of Classification Search

CPC .... G06F 40/30; G06F 16/3344; G06F 16/285; G06F 16/35; G06F 16/367; G06N 20/00; G06N 5/022; G06N 5/02; G06N 5/04

See application file for complete search history.

(56) References Cited

U.S. PATENT DOCUMENTS

| | | | | |
|---|---|---|---|---|
| 12,124,468 | B1 * | 10/2024 | Zhou | G06F 9/547 |
| 12,135,740 | B1 * | 11/2024 | Yu | G06F 16/3329 |
| 2011/0295903 | A1 * | 12/2011 | Chen | G06F 16/285<br>707/794 |
| 2019/0130289 | A1 * | 5/2019 | Giovannini | G06N 5/04 |
| 2020/0159800 | A1 * | 5/2020 | Netto | G06F 16/24578 |
| 2022/0277032 | A1 * | 9/2022 | Mohamed | G06N 5/02 |
| 2023/0259705 | A1 * | 8/2023 | Tunstall-Pedoe | G06N 3/0499<br>704/9 |
| 2024/0193192 | A1 | 6/2024 | Reilly et al. | |
| 2024/0370718 | A1 * | 11/2024 | Panagopoulou | G06N 3/045 |
| 2025/0053430 | A1 * | 2/2025 | Jones | G06F 9/453 |
| 2025/0117666 | A1 * | 4/2025 | Brenner | G06N 3/091 |
| 2025/0131289 | A1 * | 4/2025 | Larson | G06N 5/02 |
| 2025/0165717 | A1 * | 5/2025 | Burton | G06T 11/206 |

* cited by examiner

Ask or detect from a chat

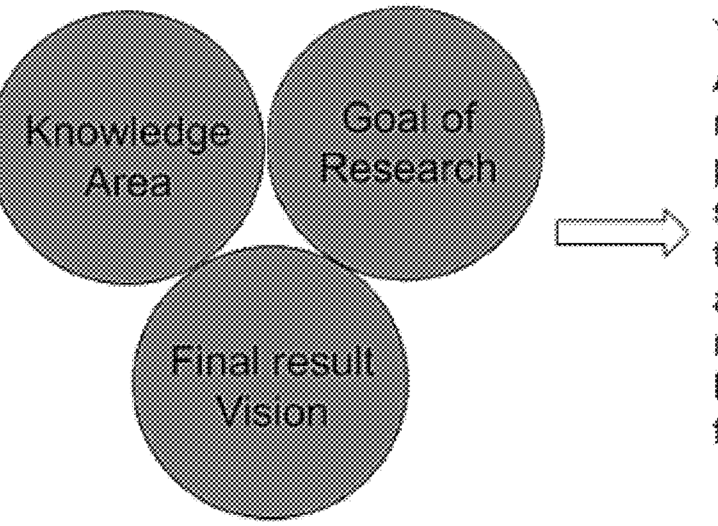

Prompt template

You are a scientist researcher from {Knowledge Area} ... You will be provided a query that is related to {Goal of Research} ... Your task is to provide the list of keywords that will be useful for searching related information for answering with taking into account {Final result Vision}. Pay attention to the most important keywords that related to {Knowledge Area} and {Goal of Research}. Sort list by keyword importance, the first word should be the most important.

FIG. 3

| Similarity | Path |
| --- | --- |
| 1 | ["Quantum technology"] |
| 1 | ["Quantum computing"] |

Path Similarity $$sim(a,b) = \frac{1}{1 + dist(a,b)}$$

A B

FIG. 6G
Hybrid Analog-Digital In-Memory Computing
Neuromorphic Computing and Beyond Ap...
Fully reconfigurable coherent optical vector-matri
Neuromorphic Computing and Sensing Market and Tech
Next-Generation Computing Paradigms
Neuromorphic computing Market and technology
Why Quantum Computing
Neuromorphic computing Market and technology
Probabilistic and Approximate Computing
Complete quantum-inspi...
Software-defined Gr...
Probabilistic Computing, Brief introduction & appl
AI for Next Generation Computing: Emerging Trends

| Similarity | Path |
| --- | --- |
| 0.33 | ["quantum computing", "academic discipline", "machine learning"] |
| 0.25 | ["quantum computing", "academic discipline", "computer science", "artificial intelligence"] |
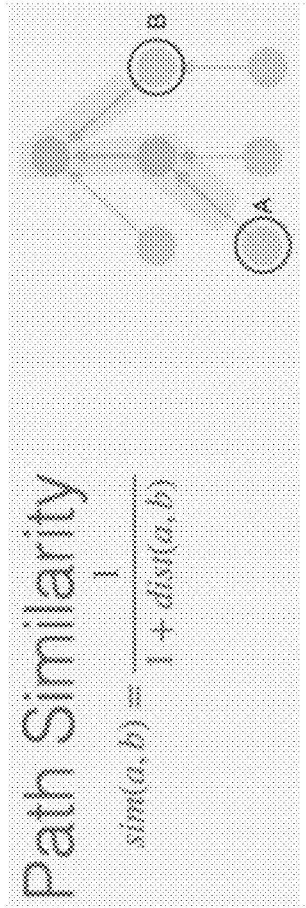
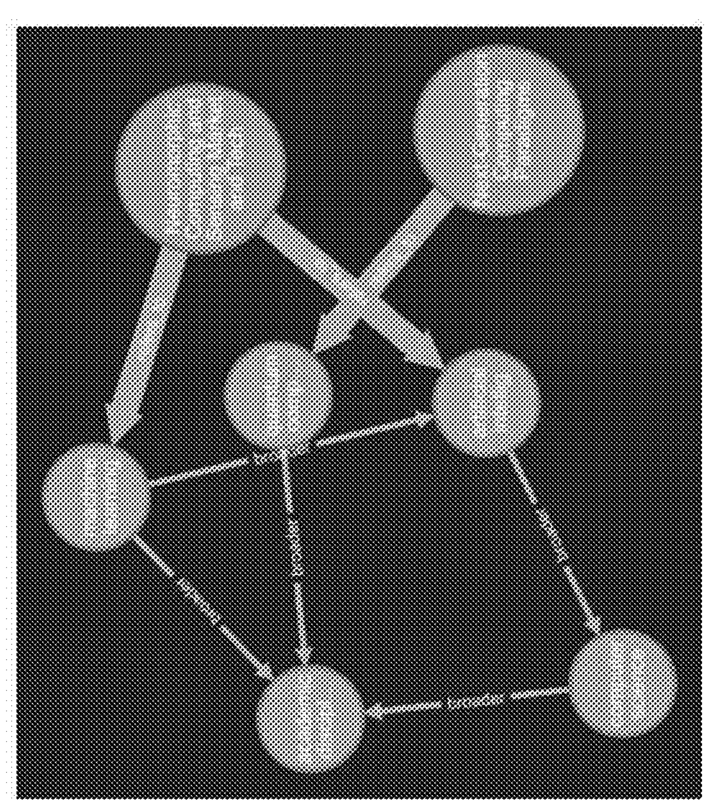
FIG. 6J

SYSTEMS AND METHODS FOR MULTIDIMENSIONAL DATA STRUCTURING AND VISUALIZATION

TECHNICAL FIELD

Embodiments relate to information technology. More specifically, embodiments relate to multidimensional data structuring and visualization.

BACKGROUND

Traditionally, data for a given knowledgebase is distributed and difficult to organize. For example, data for a given topic is typically spread among many data sources, documents, and tailored by human knowledge or interaction. Some existing solutions have attempted to use machine learning (ML) models to organize and contextualize such data.

However, ML models can suffer from LLM (large language model) hallucinations, in which ML models, particularly LLMs, produce outputs that are coherent and grammatically correct but factually incorrect or nonsensical. "Hallucinations" in this context means the generation of false or misleading information. Hallucinations can occur due to various factors, such as limitations in training data, biases in the model, or the inherent complexity of language.

Therefore, there is a need for improved data structuring, visualization, and navigation of certain knowledge bases.

SUMMARY

Embodiments substantially meet the aforementioned needs of the industry. Systems and methods can structure and visualize relative knowledge bases, including to be tailored to a user's document or knowledgebase. In one aspect, the data structures can be navigated.

In a feature and advantage of embodiments, higher accuracy and less hallucination is achieved by dynamically changing keywords based on user queries and building new connections. For example, by updating keywords (used as the basis for the graph) not based on existing documents, but instead based on the more timely and more subject-relevant user queries, accuracy and relevance score are improved. More particularly, reducing hallucinations improves large language models.

In a related feature and advantage of embodiments, optimization of calculations by narrowing knowledge processing and focusing criteria's (keywords) and graphs on a user's goal is achieved. More particularly, processing is reduced because graph rebuilding is focused on the timely and more subject-relevant user queries.

In another feature and advantage of embodiments, automation, expediting, and improving the quality of knowledge structuring is achieved. For example, by automatically updating the graph (e.g. every time) before sending a problem/response to the user, the graph more accurately captures a knowledge structure.

In an embodiment, a method for multidimensional data indexing comprises receiving a plurality of documents from a user; generating an initial graph including first keywords for the plurality of documents using a large language model (LLM); receiving, from the user, a knowledge area, a research goal, and a desired result; generating a system message template for a keywords query; embedding the knowledge area, the research goal, and the desired result to the system message template to create a system message; querying the LLM for second keywords using the system message; determining a difference in keywords between the first keywords and the second keywords; rebuilding the graph including adding at least one new connection between nodes of the graph based on the difference in keywords.

In an embodiment, a system for multidimensional data indexing comprises a graph database configured to store a plurality of graphs, each graph comprising nodes, edges, node attributes, and edge attributes; and a computing device including: at least one processor and memory operably coupled to the at least one processor, instructions that, when executed, cause the at least one processor to implement: a large language model (LLM) configured to receive a plurality of documents from a user, a graph building engine configured to generate an initial graph including first keywords for the plurality of documents using the LLM, wherein the LLM is further configured to receive, from the user, a knowledge area, a research goal, and a desired result, generate a system message template for a keywords query, embed the knowledge area, the research goal, and the desired result to the system message template to create a system message, an agent configured to query the LLM for second keywords using the system message, and wherein the graph building engine is further configured to: determine a difference in keywords between the first keywords and the second keywords, and rebuild the graph including adding at least one new connection between nodes of the graph based on the difference in keywords.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3 is an illustration of system operation of the system of FIG. 2, according to an embodiment.

FIGS. 6A-6K are an illustration of knowledge graph manipulation, according to an embodiment.

Figure 1:
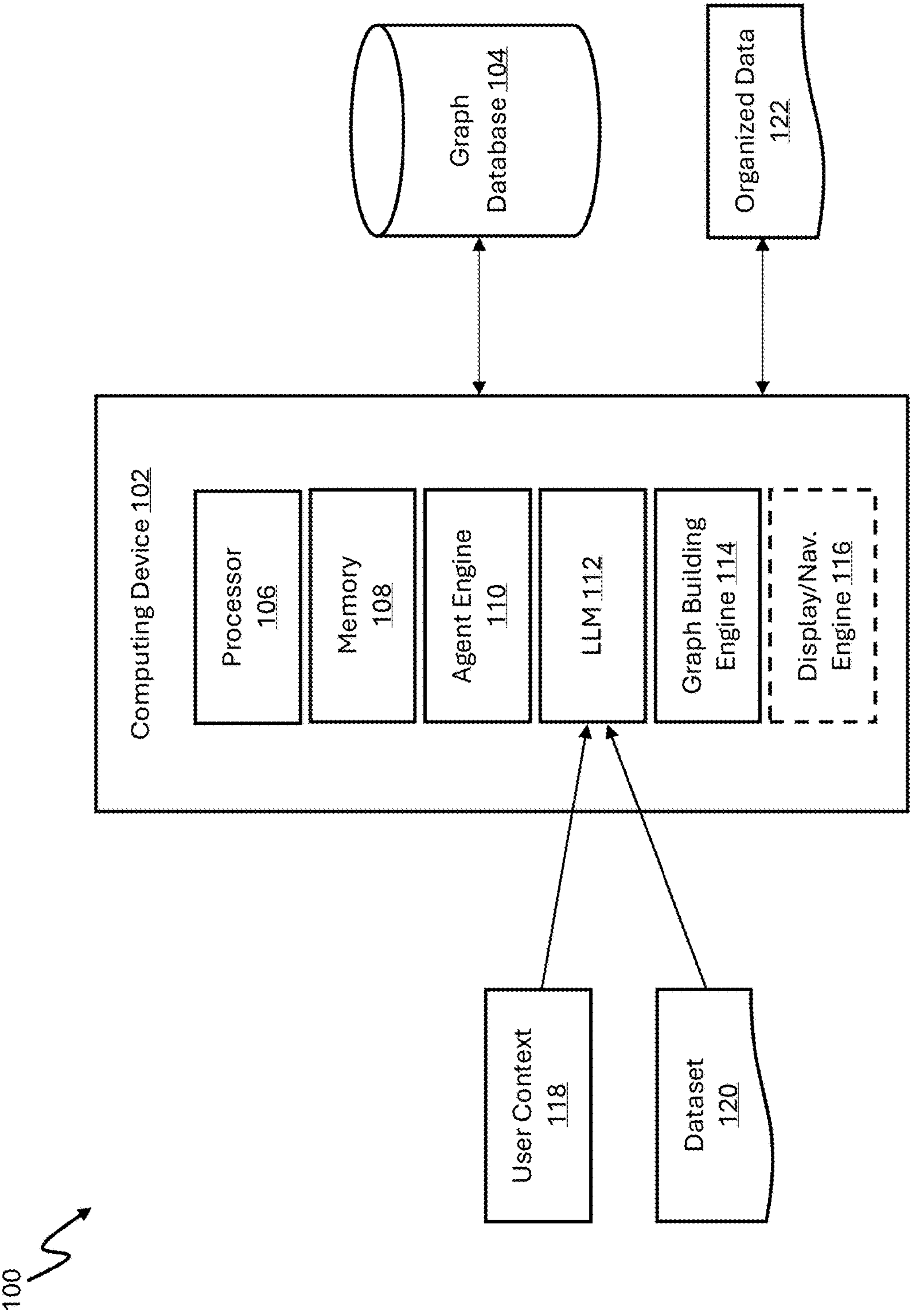
FIG. 1 is a block diagram of a system for multidimensional data structuring, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Systems and methods provide a multidimensional data structure to tailor data storage and corresponding user output. In one aspect, tailored graph data structures reduce the level of hallucination in composing an answer to a user. In particular, documents can be retrieved, collected, or otherwise obtained. In response to a user query of the documents, the user query is translated to a vector. From the vector, the most relevant ("top") pieces of documents that are as similar as possible in semantics to the question of a person can be determined and communicated to the user. In one aspect, using the vector base (vector query applied to the documents), a graph can be generated in the form of nodes and connections between data in the documents.

In embodiments, systems and methods build and update tailored graph data structures. Because graphs include variable components, key words, and so on, and concepts that are connected to these key words, such graphs can be updated with new key words and concepts while communicating with a user.

Accordingly, hallucinations are reduced. In particular, data is provided to LLMs from a set of documents, plus from external sources. More particularly, key words for updating graphs can be generated from the user request. In one aspect, utilizing a vector database reduces hallucination by 60%. When graph databases are further utilized, hallucination is further reduced. When a dynamic graph is further utilized, hallucination is even further reduced. In certain embodiments, a graph is updated every time before sending a problem/response to the user.

Referring to FIG. 1, a block diagram of a system 100 for multidimensional data structuring is depicted, according to an embodiment. System 100 generally comprises a computing device 102 and a graph database 104.

Computing device 102 comprises a computer device operable by a user and can be a desktop computer, laptop computer, tablet, mobile computing device, server, workstation, Internet-of-things device, or other computing device. Computing device 102 can further comprise many computing devices operably coupled by a network (though a user may interact with only one such computing device).

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an embodiment, computing device 102 generally comprises a processor 106, memory 108, an agent engine 110, a large language model (LLM) 112, a graph building engine 114, and optionally a display/navigation engine 116. Processor 106 can be a programmable device that accepts digital and/or analog data as input, is configured to process the input according to instructions or algorithms and provides results as outputs. In an embodiment, processor 106 can be a central processing unit (CPU) configured to carry out the instructions of a computer program or several computer programs.

Memory 108 can comprise volatile or non-volatile memory as required by the coupled processor 106 to not only provide space to execute the instructions or algorithms, but to provide the space to store the instructions themselves. In embodiments, memory 108 can further comprise temporary storage for data related to system 100. In an embodiment, processor 106 can utilize instructions stored in memory 108, that when executed by processor 106, cause processor 108 to implement the engines of computing device 102.

Agent engine 110 comprises instructions to manage the building and updating of graphs. In one aspect, agent engine 110 can command execution of the other components of computing device 102, such as LLM 112, graph building engine 114, and display/navigation engine 116. In one aspect, agent engine 110 is configured to extract keywords from an interface with a user such as a chat provided by LMM 112, compare the extracted keywords to existing keywords, and update the keywords.

In one aspect, agent engine 110 comprises a Python module configured for function and tool calling with Large Language Models (e.g. LLM 112, as will be described) including OpenAI, Gemini, and Llama. Though FIG. 1 is depicted with a single LLM 112, agent engine 110 can interface with multiple LLMs. In one aspect, agent engine 110 includes a set of predefined tools, such as keyword extraction, keyword comparison, and graph updating. Agent engine 110 can therefore analyze input data and determine the appropriate tool to utilize based on the given context.

LLM 112 comprises a large language model. In one aspect, LLM 112 can comprise a pre-trained large language model. For example, LLM 112 can include an artificial neural network (ANN) having many parameters trained on large numbers of unlabeled text. In embodiments, training can include self-supervised learning or semi-supervised learning. In one aspect, agent engine 110 can train LLM 112 such that LLM 112 is a machine learning model re-trained or updated by agent engine 110.

LLM 112 can receive dataset(s) 120 from the user (or otherwise retrieve available datasets as directed by the user). LLM 112 can further receive user context data 118. In an embodiment, LLM can provide system message prompts using a template and based on user context data 118 and dataset 120.

Graph building engine 114 can utilize LLM 112 to build and update one or more graphs. In one aspect, graph building engine 114 is configured for keyword reconciliation, keyword relevance determination, and taxonomy integration to build and update a graph.

More particularly, in one option, based on dataset(s) 120 received by LLM 112, the documents provided can be transformed by graph building engine 114 into a new graph. In another option, graph building engine 114 can operate to update an existing graph based on additional context and chat history with LLM 112.

In one aspect, graph building engine 114 comprises a graph building flow operation including first extracting keywords from document (Document - [: HAS_CONCEPT] - Concept). Graph building flow operation then links keywords to real entities from Wikidata graph through SPARQL query search or Wikipedia search. Graph building flow operation then checks keywords relevance including by comparing a keyword description provided by LLM 112 and item description from Wikipedia/Wikidata. Graph building flow operation then imports taxonomy for relevant concepts (keywords) including by considering two parent levels (Concept - [: broader]→Concept) and 1 child level (Concept -[: narrower]-Concept). Thus, a final graph has nodes: Documents, Concepts and relationships: HAS_CONCEPT, broader, narrower.

Optional display/navigation engine 116 comprises a graphical user interface for interacting with the user of system 100. In one aspect, display/navigation engine 116 can provide an interface to display the built or updated graph. In one aspect, display/navigation engine 116 can provide an interface to traverse the graph. In one aspect, display/navigation engine 116 can provide an interface to "answer" a user query based on the graph.

In one aspect, display/navigation engine 116 can provide a graph in a navigable graphical user interface. In one aspect, display/navigation engine 116 can further facilitate user interaction and coordination with graph building engine 114 to define a plurality of graph depths. The plurality of graph depths can be the number of levels parents and children that are extracted from the wikidata graph (e.g. two levels above and one level under from the concept (keyword).) Further, graph building engine 114 is further configured to extract all possible connections in the plurality documents with the keyword and keywords with concept. In one aspect, all connections with concepts according to the levels defined above (e.g. two levels above and one level under). Further, graph building engine 114 is further configured to process the possible connections by filtering and sorting most frequently used keywords (e.g. first keywords from the initial graph and second keywords from user interaction with the chat). For example, statistical (frequencies) algorithms and graph algorithms (e.g. page rank, betweenness centrality, Eigen centrality (generally it gives importance of nodes (concept in graph, keyword) and can be used for processing). Then, display/navigation engine 116 is further configured to visualize the graph in the graphical user interface as a tree mind map using the plurality of graph depths and the possible connections. Importance can be defined by node color/size, and edge thickness (for relationships).

In one aspect, display/navigation engine 116 can provide a full graph overview. Users can see a full graph picture where size of node is related to node importance and color of node related to node community. In an embodiment, "Node importance" comprises a graph metrics page rank, betweenness centrality, and Eigenvalue centrality. Users are able to select what kind of "importance" they want to see. For example, "betweenness centrality" increases the size of nodes that are "bridges" between communities in the graph. "Node community" can be detected by using graph algorithms like Modularity Class, Leiden, or Louvain. A user can select a specific node or group of nodes and expand the relationships of selected node/nodes. Display/navigation engine 116 can be configured with Cypher query language for importing information (nodes and edges) from a graph.

In one aspect, display/navigation engine 116 can provide a visual display of answers to user queries. In the graph building context used by LLM 112 for answering a user query, display/navigation engine 116 can comprise HybridGraphRAG instructions. Vector search finds the most relevant chunks/concepts by cosine similarity between user query and entity (Chunk of document, Concept). Text search (OpenSearch or full text index) finds the most relevant chunks/concepts by text index search. The most "relevant Concepts" can be extended from top of Vector and Text searches by Cypher query. For example, import neighbors of "Concept", import short path between two Concepts, imports the most important nodes from "SubGraph" that was built on "relevant concepts."

As illustrated in FIG. 1, system 100 can further comprise user context data 118. For example, a user can interface to computing device 102 to input user-specific data, including a knowledge area, a research goal, and/or a desired result. As described here, in user-specific knowledge area, research goal, or desired result is referred to as user context. In one aspect, embedding a knowledge area, a research goal, and/or a desired result into the LLM prompt allows LLM 112 to find the most relevant keywords for the user context. User context therefore helps LLM 112 extract keywords from a document that will be useful for graph querying.

As further illustrated in FIG. 1, system 100 can further comprise a user-provided dataset 120. For example, dataset 120 can comprise a set of user-provided documents. In one aspect, a user can upload dataset 120 to computing device 102. In one aspect, a user can provide a network path to dataset 120. In one aspect, dataset 120 is separately retrieved by LLM 112. In other words, dataset 120 is provided in any suitable fashion according to a user-operated networked computing device (e.g. device 102).

As further illustrated in FIG. 1, system 100 can further comprise organized data 122. In one aspect, organized data 122 can include an organized dataset such as Wikidata. In an embodiment, Wikipedia data is primarily organized through a system of categories, where each page is assigned to one or more relevant categories, creating a hierarchical tree structure that allows for navigation and grouping of related topics. Essentially, articles are classified by subject matter with further subdivisions into subcategories.

In embodiments, any public graph that includes structured concepts with hierarchies that can be described by ontology can be utilized for organized data 122. For example, [Concept subclass_of Concept, Concept used_by Concept]

Graph database 104 comprises a repository of graphs and graph data. In an embodiment, graph database 104 comprises Neo4j or Nebula, or graph database 104 can be a general-purpose database management storage system (DBMS) or relational DBMS as implemented by, for example, ORACLE, IBM DB2, Microsoft SQL Server, PostgreSQL, MySQL, SQLite, LINUX, or UNIX solutions.

Accordingly, graph database 104 comprises data elements of nodes, edges connecting nodes, and attributes of nodes and edges.

Figure 2:
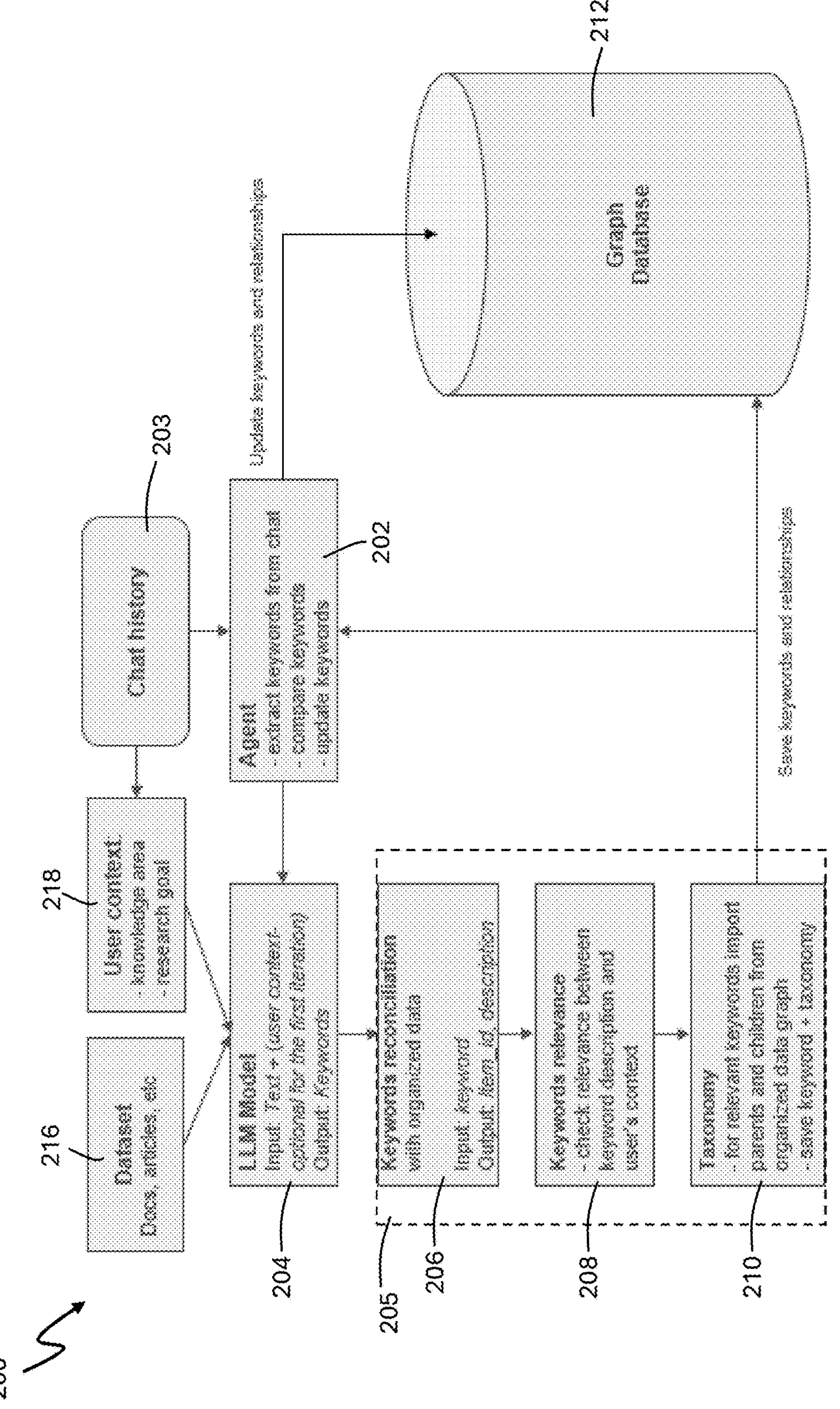
FIG. 2 is a functional block diagram of a system for multidimensional data structuring, according to an embodiment.

Referring to FIG. 2, a functional block diagram of a system 200 for multidimensional data structuring is depicted, according to an embodiment. System 200 generally comprises an agent 202, an LLM model 204, graph building engine 205 including operational functionality 206/208/210, and a graph database 212. In an embodiment, system 200 components utilize a chat interface 203 with a user. As will be described, chat interface 203 can comprise a user's interaction with LLM model 204 on a computing device.

In an embodiment, agent 202 is substantially similar to agent engine 110. As illustrated in FIG. 2, agent 202 is configured to extract keywords from chat 203, compare the extracted keywords, and update the keywords. In one aspect, agent 202 is configured to drive LLM 204. More particularly, agent 202 manages scheduling, control, and task execution, LLM 204 ensures that communication remains clear and natural.

In an embodiment, LLM 204 is substantially similar to LLM 112. In one aspect, LLM 204 receives as input dataset 216 (e.g. dataset 120) as text, for example a set of documents, and optionally user context 218 (e.g. user context 118) on the first iteration. LLM 204 is configured to query the trained model and output keywords for dataset 216.

In an embodiment, graph building engine 205 is substantially similar to graph building engine 114. In one aspect, graph building engine 205 includes keywords reconciliation operation 206 using organized data. Accordingly, an input to keywords reconciliation operation 206 is the keywords generated by LLM 204. In another example, an input to keywords reconciliation operation 206 is the difference in keywords (e.g. between a first set of keywords and a second et of keywords).

An output of keywords reconciliation operation 206 is [item_id, description]. In one aspect, item_id is a Wikidata item_id, and description is a correspondent description. For example: item: [https://www.wikidata.org/wiki/Q2]; description: Earth (Q2) third planet from the Sun in the Solar System.

For example, performing keywords reconciliation operation 206 can include finding a correspondence for each keyword in organized data (e.g. wikidata (wikidata item_id and description), Wikipedia (article summary)), and leaving, in the set of keywords (or difference in keywords) only reconciled keywords having a correspondence in organized data. More particularly, a fuzzy search for a given keyword is conducted on the external organized data. If the result of the fuzzy search is zero, then the keyword is filtered or removed from the set of keywords. If the result of the fuzzy search is non-zero, and when several results are returned, then the first result (the most relevant) is used and kept in the set.

Fuzzy searches employ various algorithms and techniques to determine the similarity between two strings of text, the search query, and the potential match in the data. Fuzzy search algorithms can include Levenshtein distance: This determines the lowest number of edits (like insertions, deletions, or substitutions) required to transform one string into another. A lower Levenshtein distance indicates greater similarity. For instance, "kitten" and "sitting" have a Levenshtein distance of 3. Fuzzy search algorithms can include Cosine similarity: This calculates the cosine of the angle between two vectors representing the words or strings. A cosine similarity of 1 represents an exact match, while 0 indicates no similarity. This can be used to compare documents based on word content. Fuzzy search algorithms can include Phonetic algorithms: These techniques, like Soundex or Metaphone, encode words based on their pronunciation. This helps in finding words that sound similar even if they have different spellings, such as "Smith" and "Smyth." Using these types of concepts, fuzzy search engines can rank potential matches based on their similarity to the original query, helping to find a range of relevant results, even if they contain minor variations from their search terms. In an embodiment, a most relevant search result can be the first returned result.

In one aspect, graph building engine 205 includes keywords relevance operation 208. Keywords relevance operation 208 is configured to check the relevance between keyword description and user context 218. Accordingly, when keywords are extracted, relevance is checked before importing taxonomy and adding to the graph.

Keywords relevance operation 208 can comprise a first option. In one aspect, the relevance of each result is checked to provide a knowledge area. In particular, a description of each result is compared with the user-provided knowledge area (e.g. by LLM prompting) when the LLM is provided ("result description"+"Knowledge Area") and asked to decide if the result is relevant or provide a relevance score. More particularly, in the first option, relevance operation 208 includes generating a description of each keyword with the LLM, comparing the description of each keyword from the LLM with the outer source for knowledge area, and removing keywords that are not relevant based on the comparing. Accordingly, for each keyword, a corresponding item is found in Wikidata or Wikipedia (external data). Using item description from Wikidata/Wikipedia for relevance detection, a comparison is made: A=(Keyword, keyword description from LLM, Knowledge Area) with B=(Keyword, description from Wikidata/Wikipedia). Thus an obtained keyword is compared with an existing description in an external source. In this option, relevance means relevance between keywords and those source(s). There could be some keywords, such as with the same spelling but from completely different areas of knowledge, which are thus excluded or given lower relevance.

Keywords relevance operation 208 can comprise a second option. In one aspect, the relevance of each result is checked by a vector similarity approach. In particular, a similarity between vector (term+description from results of fuzzy search) and vector (Knowledge Area given by user) are calculated and compared with a threshold value. If a positive answer or relevance score above the threshold value is provided, then correspondence exists. More particularly, in the second option, relevance operation 208 includes generating a first similarity vector for the keyword and the first fuzzy search result, generating a second similar vector for the knowledge area, performing a vector comparison between the first vector and the second vector and removing keywords that are not relevant based on the vector comparison.

In one aspect, graph building engine 205 includes taxonomy operation 210. For relevant keywords, parents and children are imported from organized graph data. In one example, for each relevant keyword, a Taxonomy (parent items, children items) is obtained from external resources (e.g. Wikidata based on Wikidata item_id (from "keywords reconciliation operation 206").

In an embodiment, graph database 212 is substantially similar to graph database 104 and comprises a repository of graphs and graph data. Relevant keywords and associated taxonomy (e.g. all relationships) are stored in graph database 212.

Referring further to taxonomy operation 210, for each relevant keyword, the taxonomy including all parent items and all child items of are obtained and each relevant keyword and the taxonomy are integrated in the graph through common connections and between new and existing keywords in the graph. In one aspect, a common connection can be ("broader", "narrower"). For example, a broadest term is "science", followed by "physics", then "quantum physics", and finally "quarks". If the initial term "quantum physics", the approach involves going two levels up in the taxonomy and one level down. This means that for the term "quantum physics", all three neighbors mentioned above along with their connections and hierarchy are extracted.

In one aspect, a new node for each relevant keyword and each new taxonomy node can be formed. A first connection can be formed between new nodes according to dataset 216 relationships. A second connection can be formed between new nodes according to the taxonomy retrieved (e.g. parent, superparent, etc). Accordingly, an updated graph that includes new nodes and relationships based on the current user interest is generated and stored in graph database 212.

Accordingly, in one aspect, taxonomy refers to a group of nodes and relationships that are related to the "keyword". Taxonomy is imported for each relevant keyword from a Wikidata graph.

The following code example implements taxonomy operation 210:

```
#wdtaxonomy is Wikidata-Taxonomy Command-line tool
  and library to extract taxonomies from Wikidata.
#Parent relationships
subclass_of=wdtaxonomy(wiki_id, reverse=True,
  property=None, instances=False)
instance_of=wdtaxonomy(wiki_id, reverse=True, prop-
  erty=31, instances=False)
has_use=wdtaxonomy(wiki_id, reverse-True, prop-
  erty=366, instances=False)
#Children relationships
children_cls=wdtaxonomy(wiki_id, reverse=False,
  property=None, instances=False)
```

For example:

For keyword: Ubuntu.

Correspondence with Wikidata item: [Wiki data site for Ubuntu (Q381)] is found Import taxonomy.

Parent nodes (relationship: SUBCLASS_OF):

```
Ubuntu (Q381)
└── L-Linux (Q388)
Children
Ubuntu (Q381)↑
├Kubuntu (Q11250)
├Lubuntu (Q39238)
├Xubuntu (Q72688)
├Ubuntu Kylin (Q12226408)
├Ubuntu MATE (Q18915790)
├Ubuntu Budgie (Q27964209)
├Ubuntu Unity (Q96480174)
├Ubuntu 18.04 LTS (Q110146494)
├Ubuntu Sway Remix (Q113495629)
└── Ubuntu 24.04 (Q128543567)
```

To add add keyword (Ubuntu) and taxonomy into the graph, then keyword Ubuntu and all nodes and relationships from taxonomy are added. In one aspect, it is possible that the graph contains some nodes from taxonomy, in this case only new nodes are added and wikidata_id will be the unique key In operation of system 200, a user uploads dataset 216 to system 200. System 200 can store dataset 216 in its raw form. In one aspect, a database for dataset 216 can include a partition of graph database 212, or, though not depicted in FIG. 2, other storage such as memory (e.g. 108 in FIG. 1). In one particular use case, a scientist uploads scientific articles to a database. In another use case, a teacher uploads textbooks on a certain topic or materials for some courses. If the teacher still more or less understands what he has uploaded, if he has worked a lot with these materials, most often he collects different materials and wants, for example, to understand how they fit his course. In contrast, the scientist may not understand at all what he has uploaded, because it is research, and he may wish to understand what these articles give him, because the articles can be written from different points of view.

System 200 can perform indexing of dataset 216. For example, though not depicted in FIG. 2, an indexing engine coupled to LLM model 204 can index dataset 216 according to topic, size, publication date, publication rating, citation rate, etc.

In an embodiment, standard indexing comprises using the default system message for extracting keywords without providing specific user context. For example, extract: key terms, techniques, or theories discussed in the articles.

But, when some context from a user is provided, prompting can be:

"You will be provided with a text excerpt from a larger document. The document context is as follows:
Knowledge domain: % s
Covered topics: % s Your task is to:

1. Extract a list of keywords that best represent the provided text and are relevant to the given knowledge domain.
2. Assign an importance score to each keyword, between 0 and 1, ensuring that the total sum of all keyword scores equals 1.
3. For each keyword, associate the most relevant topic from the provided list of document topics. If you believe a keyword is not relevant to any of the topics, you can assign it to the "Other" category.

Please return the results in the following JSON format:

```
{
  "keywords": [
    {"keyword": "keyword", "score": importanc-
      e_score, "topic": "relevant_topic"},
    . . .
    ]
}
"% (knowledge_domain, topics)
```

The indexed dataset can be uploaded to LLM 204.

Then, utilizing LLM 204, graph building engine 205 can generate a new graph including keywords, which can be stored in graph database 212. In one aspect, system 200 can visualize, using the generated graph. In one aspect, a user interface allows the user to visually see folders, or the graph itself, that is, some kind of visualization that will allow me to understand, even just a list, when there will be bookmarks, educational materials, datasets, training models, theoretical physics, and this grouping, this visualization is made specifically for the user based on the documents uploaded.

Continuing the use case of a scientist, consider the scientist as a researcher studying 2D materials that would allow him to create graphene cheaper, faster, or with more abundance. Accordingly, the scientist user can ask LLM 204 a query directed at these goals. In one example, the scientist user can prompt system 200 (e.g. via chat 203), and, in response, LLM model 204 can capture (e.g. via chat 203) user context 218. For example, LLM 204 can ask the user for knowledge area, goal for research (e.g. find hypothesis, general information overview, generate knowledge, and vision of the end result (e.g. an article, solution for a task, if his work is duplication).

A system message template with keywords query can be generated by LLM 204. Referring to FIG. 3, an illustration of system operation of the system of FIG. 2 is depicted, according to an embodiment. In particular, FIG. 3 depicts a system message template as a prompt to an LLM (e.g. 204). In one aspect, knowledge area, research goal ("goal of research"), and desired result ("final result vision"). More particularly, the answers determined in chat 203 are embedded into the system message template.

LLM 204 can then be queried for keywords by the system message. Graph building engine 205 determines the difference between initial keywords and keywords generated on the query and rebuilds the graph. On one aspect, new connections rebuilding comprises adding new connection(s) based on the difference in keywords.

Accordingly, system 200 first makes a categorization (e.g. initial graph), then an assessment of documents in accordance with these categories, and then shows the result of the assessment, structured, that is, it shows the data, structured, in accordance with the categorization carried out and the assessment carried out (e.g. rebuilt graph). In the scientist use case, the scientist user can be provided a visual display of the structure of graphene with the help of computer or neural networks. In one example, if there is no definition of graphene anywhere, the system can find gaps, and the system can inform the user that which needs to be added-either use information from the user, or add documents on such desired gaps.

Figure 4:
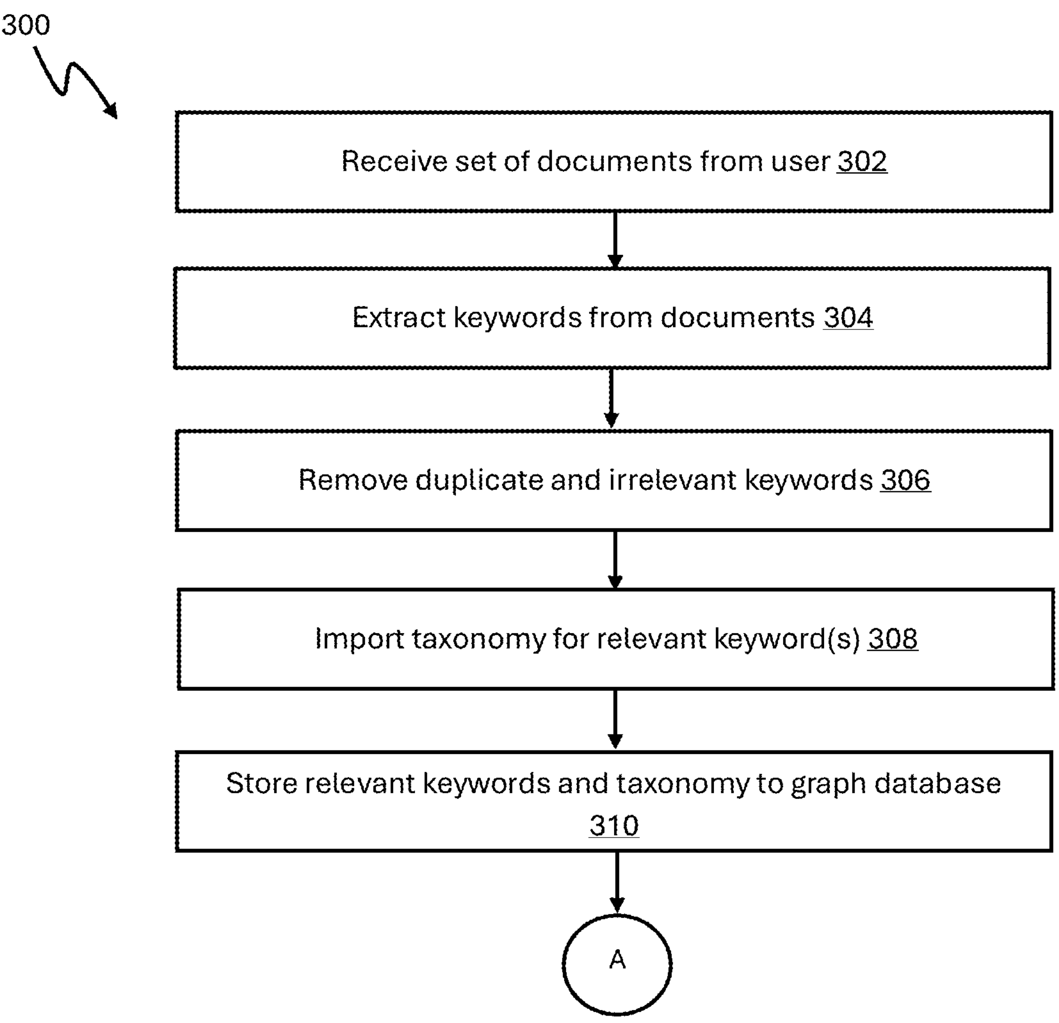
FIG. 4 is a flowchart of a method for building a multidimensional data structure, according to an embodiment.

Referring to FIG. 4, a flowchart of a method 300 for initial building a multidimensional data structure is depicted, according to an embodiment. For example, upon the first iteration of building a graph, method 300 is executed.

At 302, a set of documents is received from a user.

At 304, one or more keywords are extracted from the set of documents received at 302. Optionally, keywords are extracted using user context. Optionally, keywords are extracted without user context, such as when the user context data is not provided or is empty.

At 306, duplicate and irrelevant keywords are removed. For example, duplicates are reconciled by linking organized data (e.g. Wikidata) entries to the keywords associated with the set of documents received from the user. Irrelevant keywords can be removed when no corresponding organized data entry corresponds to a keyword associated with the set of documents received from the user.

In one aspect, two phases of duplicate removing comprises, after linking to keywords to Wikidata item, each keyword has a corresponding Wikidata item id, for example: Earth has wikidata link https://www.wikidata.org/wiki/Q2 and wikidata_id="Q2". After that operation, keywords with the same wikidata_id can be combined in one node: Concept with saving relationships to sources (Document extracted keyword was extracted). If keywords do not have relevant Wikidata links, filtering by keyword name and document frequency can be used.

At 308, for each relevant keyword (e.g. non-duplicate and non-irrelevant keywords), taxonomy data (parents and children) is imported from the organized data (e.g. Wikidata).

At 310, the relevant keywords and corresponding taxonomy are stored in a graph database as a connected graph. Accordingly, the result of method 300 is a multidimensional data structure as a connected graph in which nodes (keywords) are real concepts from organized data (e.g. Wikidata) and connections (relationships) represent associations from concept taxonomy.

Figure 5:
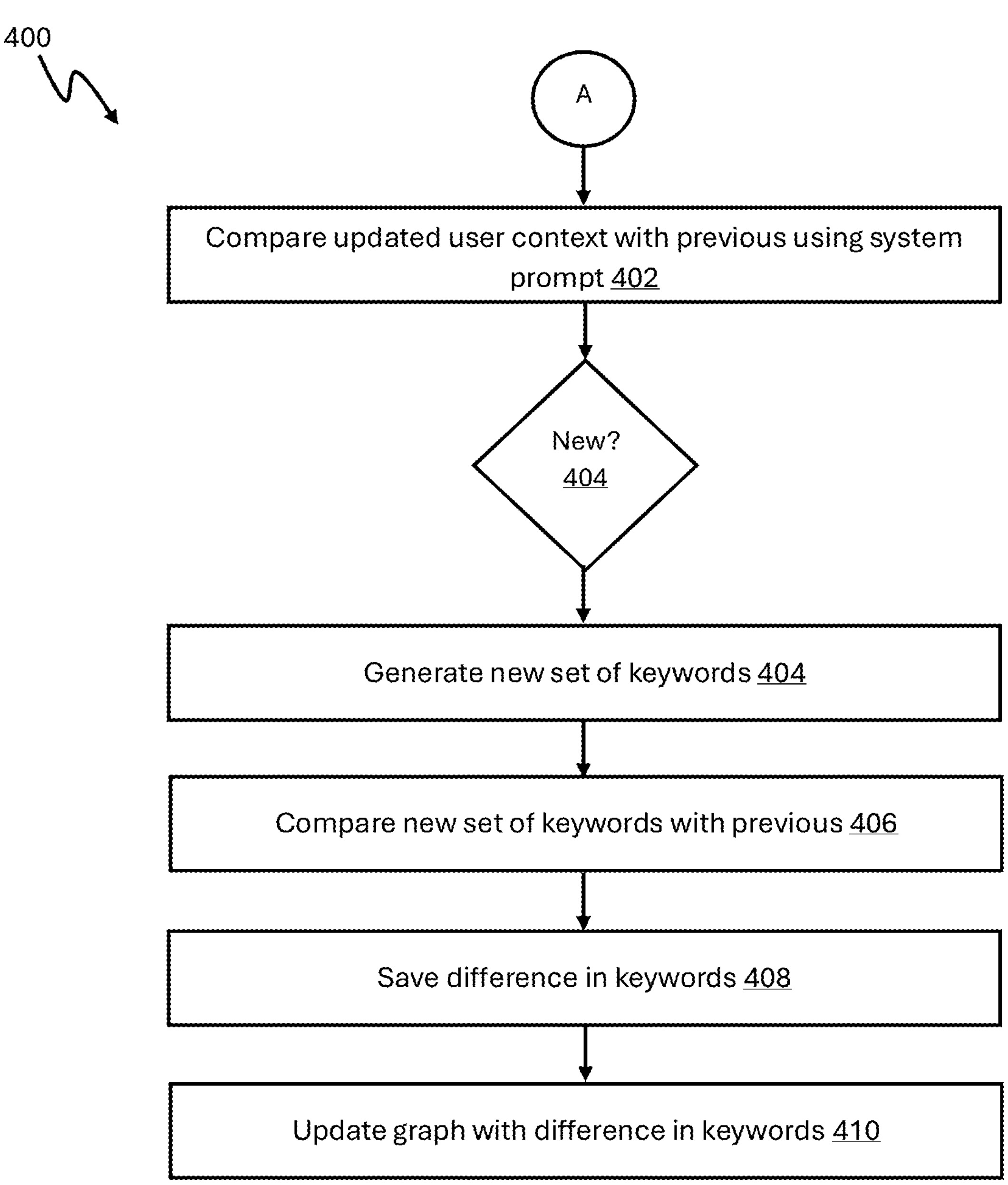
FIG. 5 is a flowchart of a method for updating a multidimensional data structure, according to an embodiment.

Referring to FIG. 5, a flowchart of a method 400 for updating a multidimensional data structure is depicted, according to an embodiment. In an embodiment, method 400 can be executed after method 300, as illustrated by the corresponding elements A-A in FIGS. 4-5.

At 402, an agent launches a graph updating process based on comparing an updated user context (e.g. knowledge area, research goal) with a previous user context (e.g. empty or standard or received from the previous iteration). In an embodiment, an updated user context is retrieved by user input to a system prompt, such as by LLM 112.

At 404, if the updated user context is new, then a new set of keywords is generated at 406. For example, new keywords can be generated from the updated user context as the difference from the previous context. In one aspect, the new keywords can be generated from the difference in the updated user context from the immediately preceding user context. In one aspect, the new keywords can be generated from the difference in the updated user context from another preceding user context.

In one aspect, with further reference to the previously-described extracted user context (knowledge area, research goal, etc) from chat history, the user context is used by the LLM for extracting keywords (as previously described). The agent runs the process "compare keywords". This process includes next steps: 1) extract keywords from documents but use the updated prompt that contains knowledge area, research goal etc., 2) compare current keywords set from a graph with a new set of keywords, and 3) add keywords from a difference into the graph.

At 408, the difference in keywords is stored. In one aspect, two sets of keywords are obtained. Set A contains current keywords in the graph. Set B contains keywords that were extracted from documents using the updated prompt. Difference(Set (A), Set (B))—contains new keywords that are not present in the current graph.

At 410, the graph is updated by the difference in keywords at 408, reconciliation and relevance (e.g. as 306 in the first iteration), and by importing the taxonomy (e.g. as in 308 in the first iteration).

Accordingly, the result of method 400 is an updated multidimensional data structure as a connected graph that includes new keywords with taxonomy and taxonomy-based relationships. This updated graph using an updated system prompt (knowledge area, research goal) improves relevance of extracted keywords in future iterations.

To execute meaningful multidimensional data storage, Datacatalog can be utilized. Datacatalog is a sub-system configured for storing and managing data of any type, offering a flexible and scalable solution for handling heterogeneous data through the use of specialized containers and an SDK. Datacatalog is implemented as a service accessible via REST API and GraphQL.

In one aspect of structure and data storage, a metadata table comprises Object Type (type), which specifies the type of entry in Datacatalog, which can be, for example Dataframe, a tabular data stored in a structure similar to pandas DataFrame; Dataset, a flexible container that can hold any objects, including other Datasets and Dataframes, or Raw, Arbitrary data stored in a binary format. A metadata table can further comprise Custom Type (custom_type), which is used for objects of type Raw to indicate how such data should be serialized or deserialized, allowing the system to work with any data format. A metadata table can further comprise Parents and Children (parent and children), which describe the hierarchical relationships of the object with other objects in Datacatalog. Parents and Children enables complex structures and dependencies between data. A metadata table can further comprise Binary Data (raw), as a field for storing the data in its original binary form.

For objects of type Dataframe, an additional table can be created in the database, where data are stored in a tabular form. In one aspect, each column in the additional table has a data type, which can be simple (e.g., int, float, string) or complex (e.g., references to other Datacatalog objects). When querying data, the SDK can automatically interpret these references and convert the references into the appropriate object types.

In one aspect, for handling external data, raw objects can contain links to external data storage systems such as MongoDB or S3. The SDK manages these links and can automatically fetch data from external sources, simplifying the user's interaction with large or remote data.

In one aspect, REST API and GraphQL allows Datacatalog to be accessible, providing flexibility and ease of integration with various applications and services. The service manages the storage of metadata for Datacatalog objects and the tabular data for Dataframes through such APIs.

In one aspect, Datacatalog can be extended through SDK. For example, SDK can operate via REST API and GraphQL, allowing users to interact with Datacatalog and integrate their own solutions. In a further extension, custom data types can be utilized. The SDK supports adding new data types with custom serialization and deserialization methods. This makes the system highly flexible and capable of handling data in any format required by the user. In a further extension, the SDK also automatically transforms raw data and references into the required formats when retrieving data. This facilitates easy access and manipulation of data, regardless of its original format or location.

Therefore, Datacatalog serves as a universal repository capable of efficiently managing data of any type and format. With its support for complex and user-defined data types through the SDK, the system allows seamless integration and processing of heterogeneous data, including links to external databases and storage systems. The service architecture with REST API and GraphQL ensures flexible access and data management, while the SDK provides powerful tools for extending functionality and working with custom data types.

Referring to FIGS. 6A-6K, an illustration of knowledge graph manipulation is depicted, according to an embodiment.

Figure 6A:
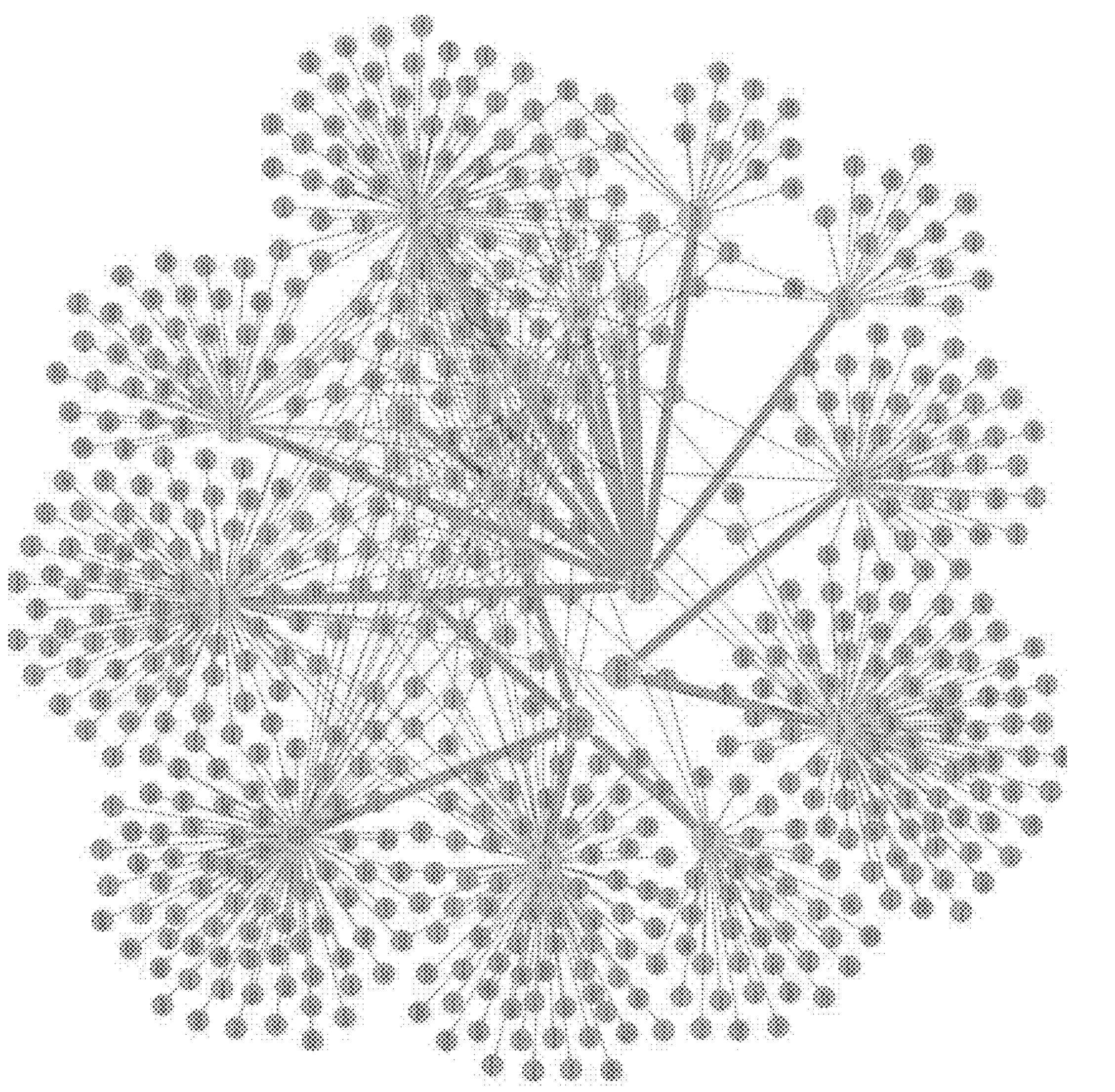

FIG. 6A illustrates a knowledge graph based on "inner" knowledge. In particular, the nodes form high-level topics based on articles and keywords. The relationships (connections between nodes) are formed according to an article that "has keyword" or "belongs to cluster."

Figure 6B:
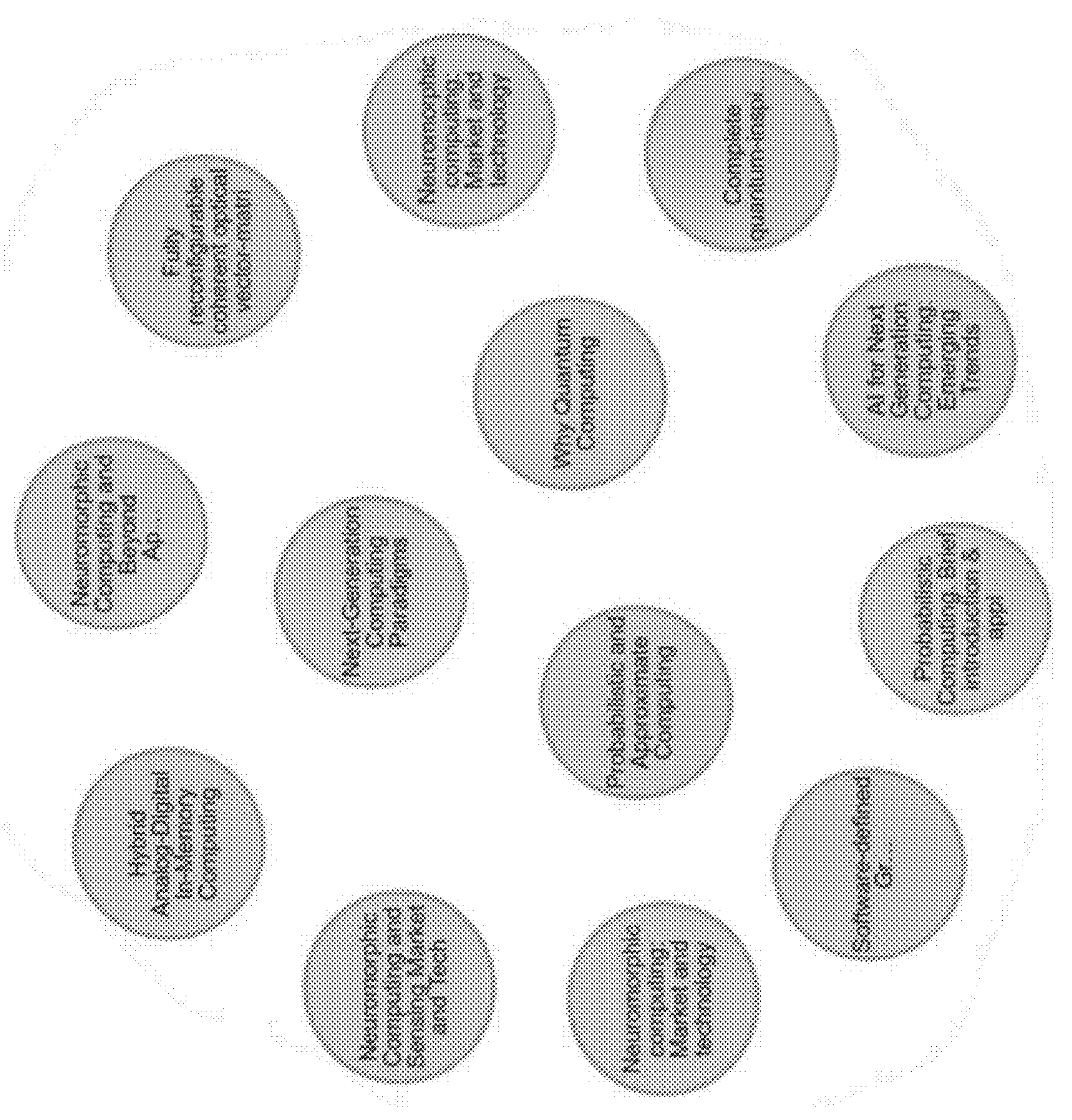

FIG. 6B illustrates an initial step for articles. In particular, FIG. 6B illustrates a collection of articles without relationships. In particular, FIG. 6B illustrates a set of documents. Relationships are then determined based on "inner" knowledge-keywords of the documents and clusters (high level topics).

Figure 6C:
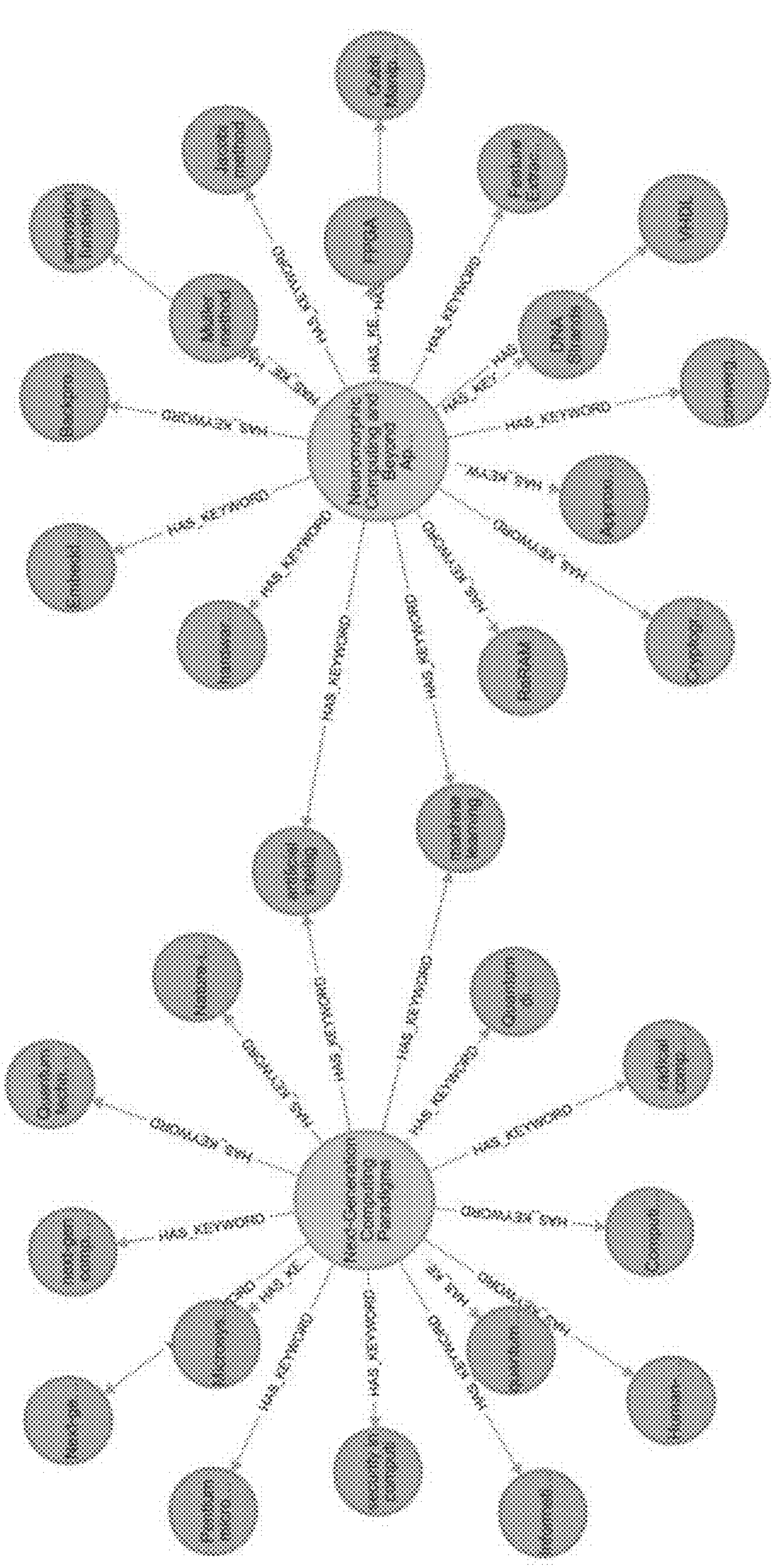

FIG. 6C illustrates keyword extraction. In one aspect, articles are linked through common keywords. In particular, FIG. 6C illustrates that documents have common keywords that allow connections to be built between the common keywords.

Figure 6D:
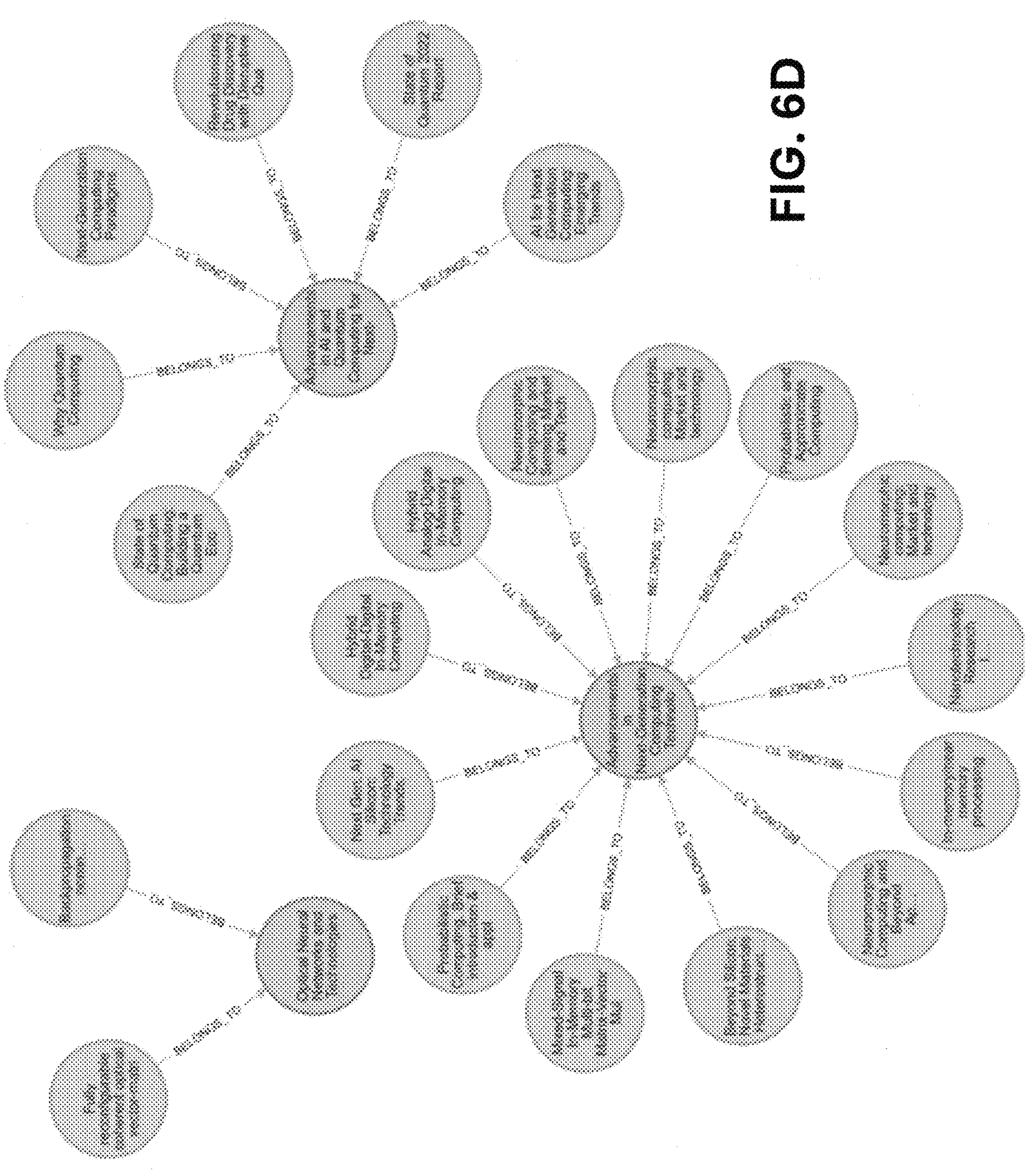

FIG. 6D illustrates clustering. In one aspect, hierarchical agglomerative clustering is based on document embedding similarity. Connections are built through detected clusters.

Figure 6E:
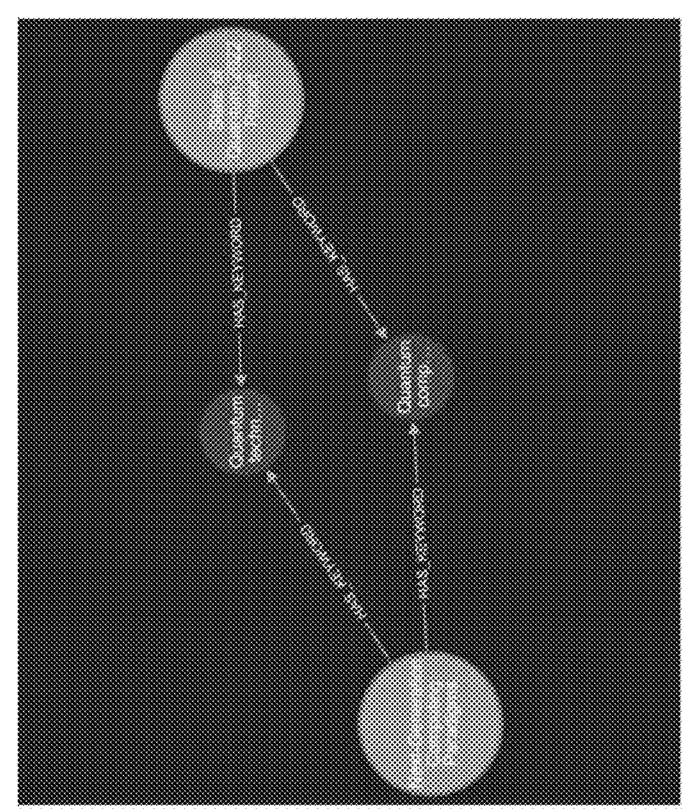

FIG. 6E illustrates similarity path calculation. In one aspect, a similarity path is built between two documents through keywords. In one aspect, path similarity is calculated according to Equation 1.

$$sim(a, b) = 1/1 + dist(a, b) \qquad \text{(Equation 1)}$$

Figure 6F:
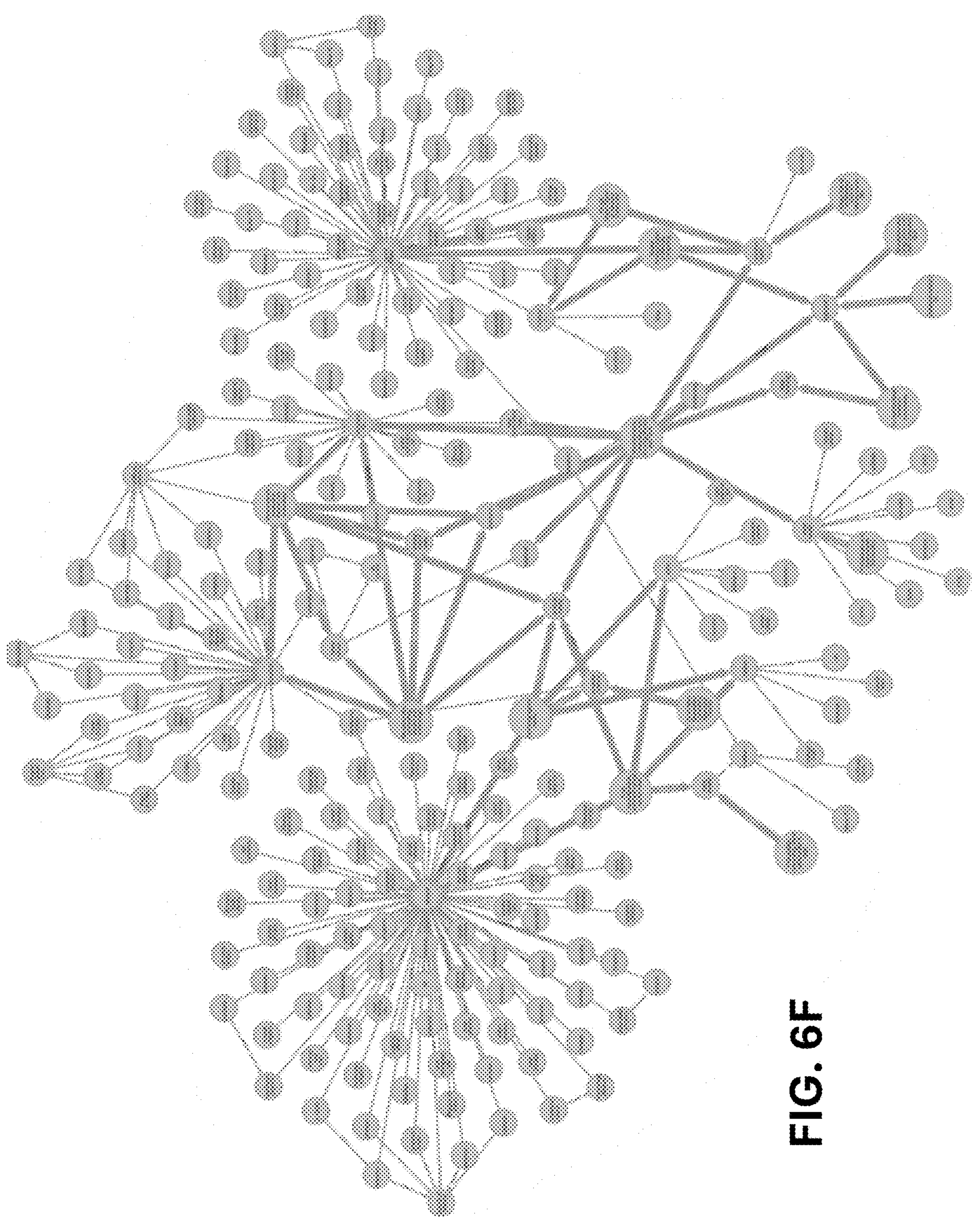

FIG. 6F illustrates a knowledge graph based on "external" knowledge. In one aspect, external knowledge comprises an organized data set such as WikiData. Connections between documents through common "entities" are provided by the external knowledge graph. Nodes comprise articles (inner data) and concepts (external data). Relationships comprise an article "refers to" a concept, and where a "concept" refers to a "broader" concept.

In one aspect, FIG. 6F illustrates that connectivity can be increased between documents through importing taxonomy of concepts from Wikidata. New concepts from wikidata that have connections with existing in the graph concepts can be added. Concepts have common parents or children in the taxonomy.

Figure 6G:

FIG. 6G illustrates an initial step for articles. In particular, FIG. 6E illustrates a collection of articles without relationships. Relationships are then determined based on "external" knowledge—named entity extraction and external organized data linking.

Figure 6H:
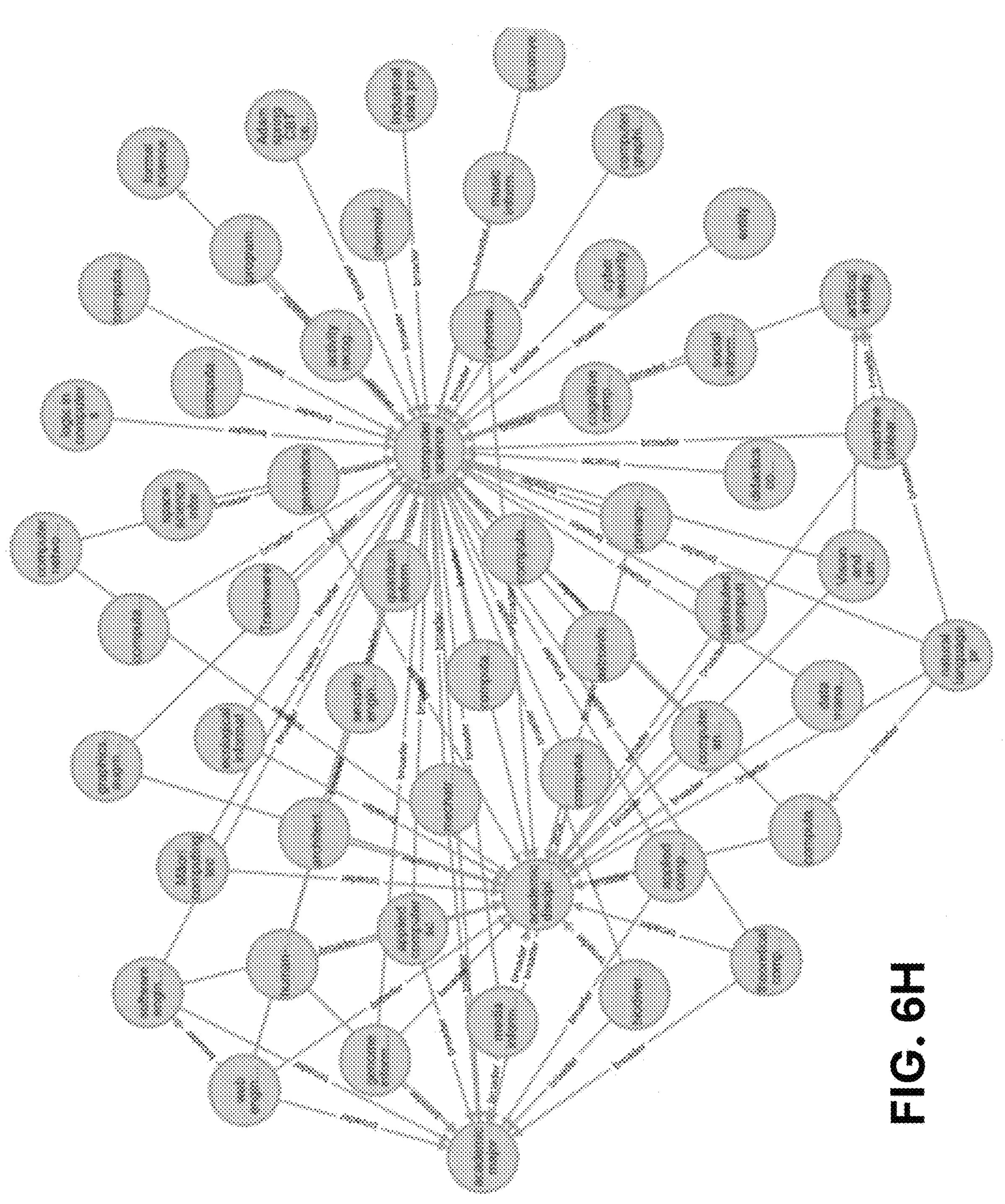

FIG. 6H illustrates an import related to the external organized data (e.g. Wikidata graph). In one aspect, articles from "named entities" are extracted (e.g. using Google Natural Language API). Only entities with wiki-links are left, and subsequently, the related part from Wikidata graph is imported.

Figure 6I:
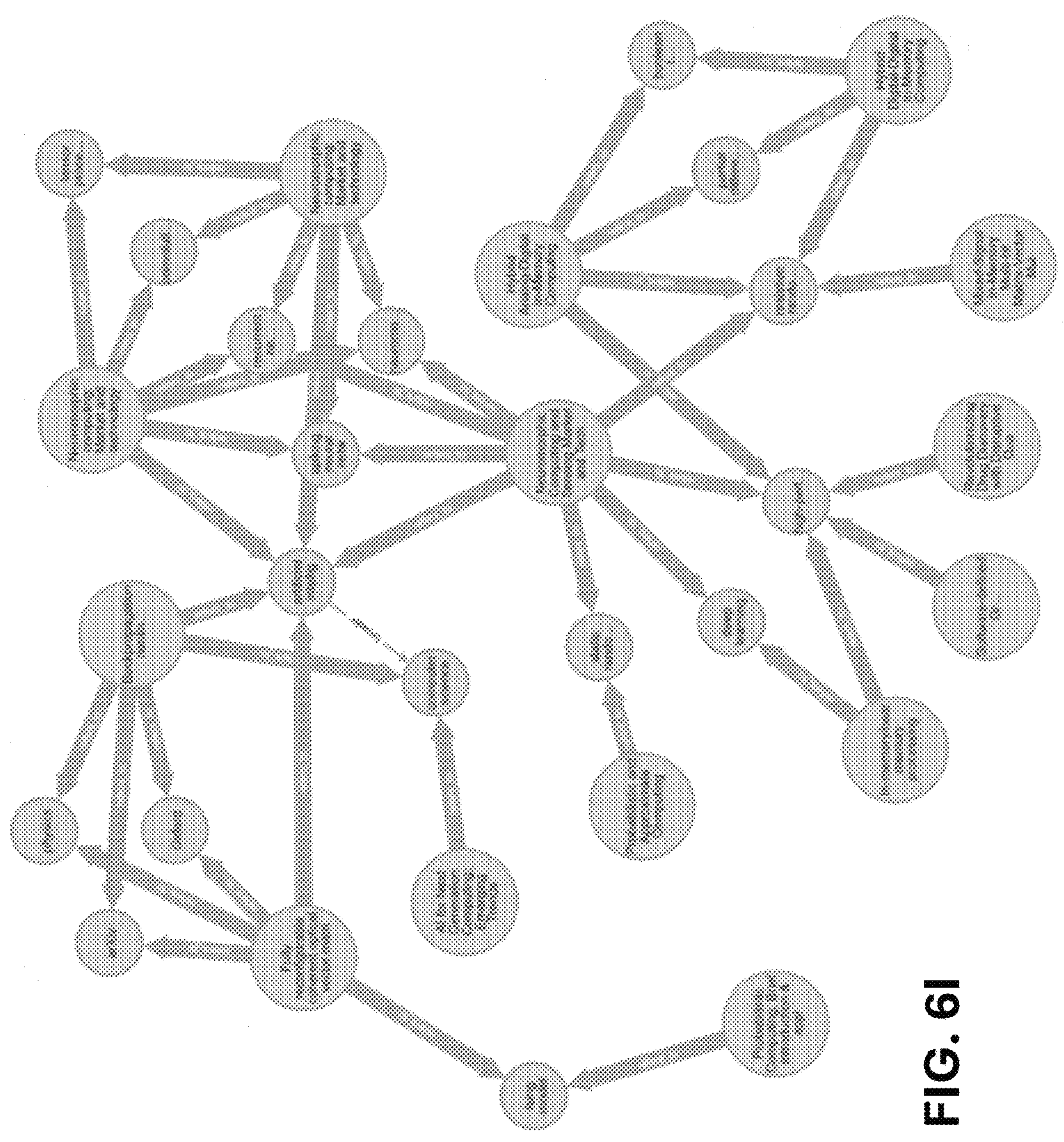

FIG. 6I illustrates building connections with external organized data. In one aspect, articles with "external" knowledge (concepts) are linked. Relationships comprise an article "refers to" a concept, and where a "concept" refers to a "broader" concept.

FIG. 6J illustrates similarity path calculation. In one aspect, a similarity path is built between two documents through the respective organization of the organized external data, such as Wikidata relationships. In one aspect, path similarity is calculated according to Equation 1.

Figure 6K:
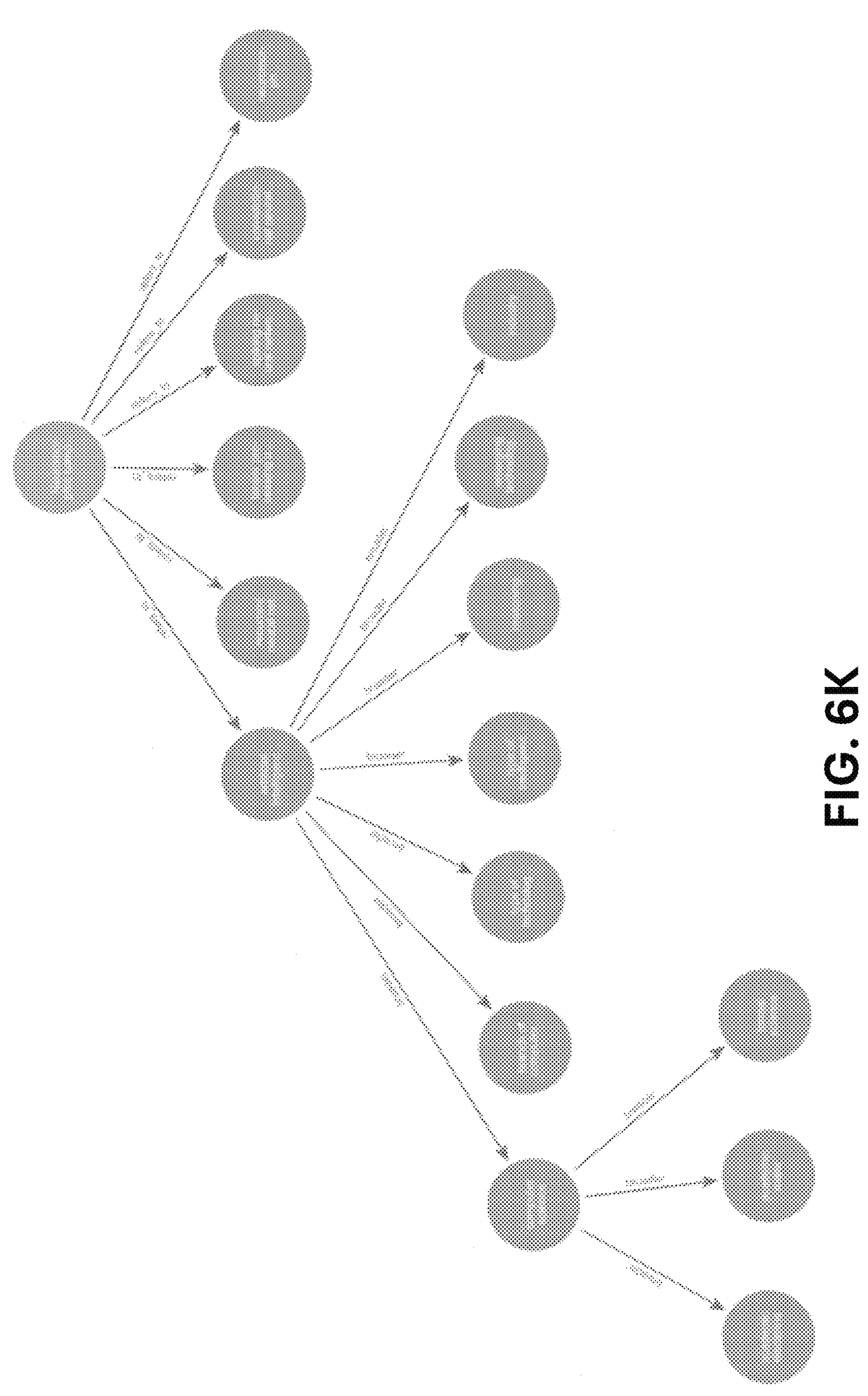

FIG. 6K illustrates knowledge graph taxonomy. In one aspect, FIG. 6K is provided in a hierarchical layout visualization in which documents and connected taxonomy are provided from Wikidata graph relationships.

Figure 7:
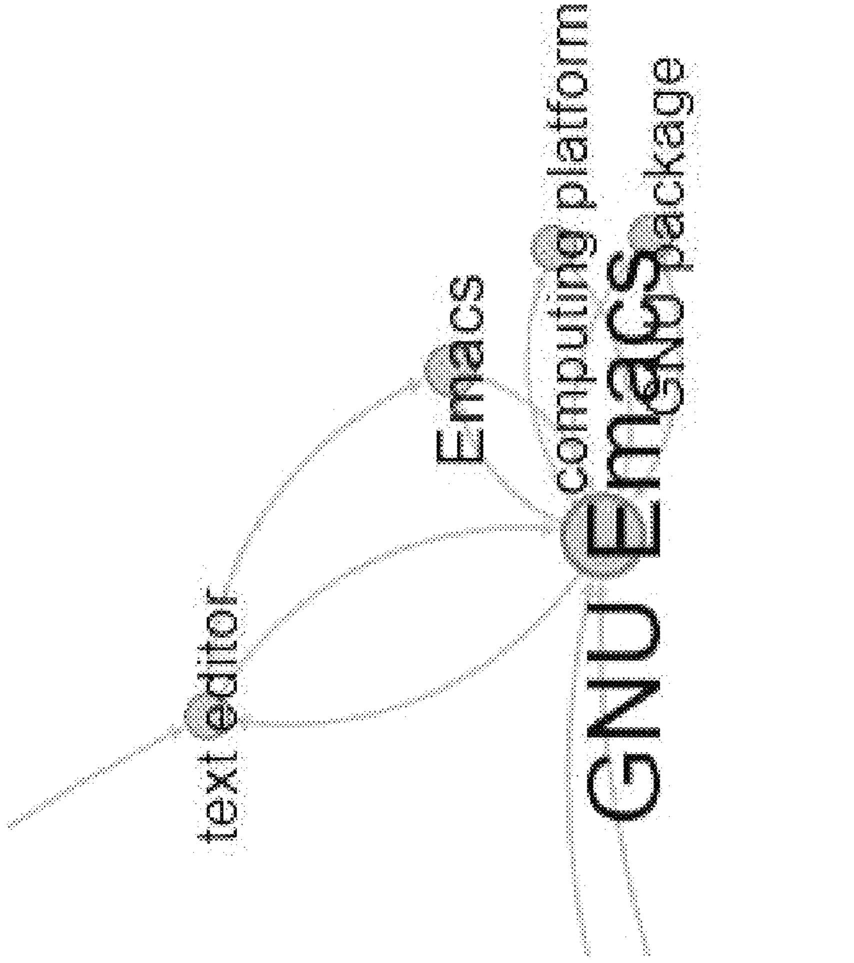
FIG. 7 is an illustration of a portion of a knowledge graph, according to an embodiment.

Referring to FIG. 7, an illustration of a portion of a knowledge graph is depicted, according to an embodiment. In particular, FIG. 7 depicts node "GNU Emacs" in the largest font. Nodes "text editor", "Emacs", "computing platform", and "GNU package" are depicted in smaller and similar sized font. In an embodiment, larger font size represents the importance or prominence of that entity within the graph; larger font sizes indicate more significant entities, while smaller font sizes represent less important ones. Significance can include factors like how frequently they are connected to other nodes or their overall relevance to the data set being visualized. Relationships between the nodes are depicted with arrows (including for nodes in the graph but not depicted in FIG. 7—a relationship edge to "text editor" and two relationship edges to "GNU Emacs"). Each arrow between a node is considered a relationship.

The invention claimed is:

1. A method for multidimensional data indexing, the method comprising:

receiving a plurality of documents from a user;

translating the plurality of documents into a first vector query;

querying a large language model (LLM) with the first vector query to generate first keywords for the plurality of documents;

generating an initial graph with the first keywords for the plurality of documents;

receiving, from the user, a knowledge area comprising a specific domain field, a research goal comprising at least one task, and a desired result comprising a final vision associated with the research goal;

generating a system message template for a keywords query;

embedding the knowledge area, the research goal, and the desired result to the system message template to create a system message;

translating the system message into a second vector query;

querying the LLM with the second vector query to generate second keywords;

determining a difference in keywords between the first keywords and the second keywords, wherein the difference includes at least one keyword that is in the first keywords but not in the second keywords or at least one keyword that is in the second keywords but not in the first keywords;

rebuilding the graph including adding at least one new connection between nodes of the graph based on the difference in keywords.

2. The method of claim 1, wherein rebuilding the graph further comprises: performing keywords reconciliation including:

finding a correspondence for each of the difference in keywords in organized data including by conducting a fuzzy search for a given keyword in the organized data, and leaving only reconciled keywords having correspondence in organized data in the difference in keywords by when the fuzzy search returns 0, filtering out the given keyword and when the fuzzy search returns one or more results, using a first fuzzy search result.

3. The method of claim 2, wherein rebuilding the graph further comprises:

performing keywords relevance including:

generating a description of each keyword with the LLM, comparing the description of each keyword from the LLM with a knowledge area defined in the organized data, and removing keywords that are not relevant based on the comparing.

4. The method of claim 2, wherein rebuilding the graph further comprises:

performing keywords relevance including:

generating a first similarity vector for the keyword and the first fuzzy search result, generating a second similarity vector for the knowledge area, performing a vector comparison between the first vector and the second vector, and removing keywords that are not relevant based on the vector comparison.

5. The method of claim 1, wherein rebuilding the graph further comprises:

for each relevant keyword, obtaining a taxonomy from organized data, wherein the taxonomy includes all parent items and all child items the relevant keyword; and integrating each relevant keyword and the taxonomy in the graph through common connections and between new and existing keywords in the graph.

6. The method of claim 5, wherein rebuilding the graph further comprises:

forming a new node for each relevant keyword and each new taxonomy node;

forming a new edge for a first relationship in the plurality of documents; and forming a new edge for a second relationship according to the taxonomy.

7. The method of claim 1, wherein generating the initial graph comprises:

creating a first plurality of nodes from an inner context of the plurality of documents;

clustering the first plurality of nodes according to a category of knowledge; and forming the initial graph having at least three levels based on the first keywords and the clustering of the first plurality of nodes.

8. The method of claim 7, further comprising:

creating an updated plurality of nodes based on the inner context of the plurality of documents and the difference in keywords;

provided additional context about clustering the updated plurality of nodes according to a category of knowledge; and forming a new graph based on the additional context.

9. The method of claim 8, wherein determining the difference between the first keywords and the second keywords further comprises comparing the first keywords and the second keywords to find at least one difference, and wherein providing the difference to the user further comprises modifying only the at least one difference in the graphical user interface.

10. The method of claim 1, further comprising providing the graph in a navigable graphical user interface.

11. The method of claim 10, wherein providing the graph in a navigable graphical user interface further comprises:

defining a plurality of graph depths;

extracting all possible connections in the plurality documents with the keyword and keywords with concept;

processing the possible connections by filtering and sorting most frequently used first keywords and second keywords;

visualizing the graph in the graphical user interface as a tree mindmap using the plurality of graph depths and the possible connections.

12. The method of claim 1, wherein the knowledge area, the research goal, and the desired result are captured from a user interface chat with the user.

13. The method of claim 1, further comprising:

indexing the plurality of documents as an indexed plurality of documents before generating the initial graph, wherein generating the initial graph further comprises uploading the indexed plurality of documents to the LLM.

14. A system for multidimensional data indexing, the system comprising:

a graph database configured to store a plurality of graphs, each graph comprising nodes, edges, node attributes, and edge attributes; and a computing device including:

at least one processor and memory operably coupled to the at least one processor, instructions that, when executed, cause the at least one processor to implement:

a large language model (LLM) configured to receive a plurality of documents from a user, a graph building engine configured to generate an initial graph including first keywords for the plurality of documents, wherein the LLM is further configured to:

receive, from the user, a knowledge area comprising a specific domain field, a research goal comprising at least one task, and a desired result comprising a final vision associated with the research goal, generate a system message template for a keywords query, and embed the knowledge area, the research goal, and the desired result to the system message template to create a system message, an agent configured to translate a query of the plurality of documents into a first vector query of the LLM to generate first keywords and translate the system message into a second vector query of the LLM to generate second keywords, and wherein the graph building engine is further configured to:

determine a difference in keywords between the first keywords and the second keywords wherein the difference includes at least one keyword that is in the first keywords but not in the second keywords or at least one keyword that is in the second keywords but not in the first keywords, and rebuild the graph including adding at least one new connection between nodes of the graph based on the difference in keywords.

15. The system of claim 14, wherein the graph building engine is further configured to rebuild the graph including:

performing keywords reconciliation including:

finding a correspondence for each of the difference in keywords in organized data including by conducting a fuzzy search for a given keyword in the organized data, and leaving only reconciled keywords having correspondence in organized data in the difference in keywords by when the fuzzy search returns 0, filtering out the given keyword and when the fuzzy search returns one or more results, using a first fuzzy search result.

16. The system of claim 15, wherein the graph building engine is further configured to rebuild the graph including:

performing keywords relevance including:

generating a description of each keyword with the LLM, comparing the description of each keyword from the LLM with the knowledge area, and removing keywords that are not relevant based on the comparing.

17. The system of claim 15, wherein the graph building engine is further configured to rebuild the graph including:

performing keywords relevance including:

generating a first similarity vector for the keyword and the first fuzzy search result;

generating a second similarity vector for the knowledge area;

performing a vector comparison between the first vector and the second vector;

removing keywords that are not relevant based on the vector comparison.

18. The system of claim 14, wherein the graph building engine is further configured to rebuild the graph including:

for each relevant keyword, obtaining a taxonomy from organized data, wherein the taxonomy includes all parent items and all child items the relevant keyword; and integrating each relevant keyword and the taxonomy in the graph through common connections and between new and existing keywords in the graph.

19. The system of claim 18, wherein the graph building engine is further configured to rebuild the graph including:

forming a new node for each relevant keyword and each new taxonomy node;

forming a new edge for a first relationship in the plurality of documents; and forming a new edge for a second relationship according to the taxonomy.

20. The system of claim 14, the graph building engine is further configured to generate the initial graph including:

creating a first plurality of nodes from an inner context of the plurality of documents;

clustering the first plurality of nodes according to a category of knowledge; and forming the initial graph having at least three levels based on the first keywords and the clustering of the first plurality of nodes.

* * * * *